(12) United States Patent
Sinnhuber et al.

(10) Patent No.: US 6,536,799 B2
(45) Date of Patent: Mar. 25, 2003

(54) SAFETY DEVICE WITH AN AIRBAG CONFIGURATION INCLUDING MULTIPLE AIRBAGS FOR A MOTOR VEHICLE

(75) Inventors: Ruprecht Sinnhuber, Gifhorn (DE); Thomas Wohllebe, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/923,717

(22) Filed: Aug. 6, 2001

(65) Prior Publication Data

US 2002/0020990 A1 Feb. 21, 2002

Related U.S. Application Data

(63) Continuation of application No. PCT/EP00/00557, filed on Jan. 20, 2000.

(30) Foreign Application Priority Data

Feb. 5, 1999 (DE) .......................................... 199 04 740

(51) Int. Cl.[7] .......................... B60R 21/32; B60R 21/16
(52) U.S. Cl. ................. 280/735; 280/743.1; 280/743.2; 280/732
(58) Field of Search ............................. 280/728.1, 735, 280/743.1, 743.2, 734, 732

(56) References Cited

U.S. PATENT DOCUMENTS

| | | | | |
|---|---|---|---|---|
| 5,722,686 A | * | 3/1998 | Blackburn et al. | 280/731 |
| 5,762,367 A | * | 6/1998 | Wolanin | 280/736 |
| 5,887,894 A | * | 3/1999 | Castagner et al. | 280/735 |
| 5,957,490 A | * | 9/1999 | Sinnhuber | 280/735 |
| 5,964,478 A | * | 10/1999 | Stanley et al. | 280/735 |
| 5,997,033 A | * | 12/1999 | Gray et al. | 280/735 |
| 6,164,694 A1 | * | 2/2001 | Edgren | 280/735 |
| 6,186,540 B1 | * | 2/2001 | Edgren | 280/735 |
| 6,189,928 B1 | * | 2/2001 | Sommer et al. | 280/731 |
| 6,254,127 B1 | * | 7/2001 | Breed et al. | 280/731 |
| 6,254,130 B1 | * | 7/2001 | Jayaraman et al. | 280/731 |
| 6,273,461 B1 | * | 8/2001 | Kaiker et al. | 280/732 |
| 6,308,983 B1 | * | 10/2001 | Sinnhuber | 280/735 |
| 6,315,323 B1 | * | 11/2001 | Pack, Jr. | 280/735 |
| 6,328,335 B1 | * | 12/2001 | Mueller | 280/735 |

FOREIGN PATENT DOCUMENTS

| | | |
|---|---|---|
| DE | 0 796 771 A1 | 9/1997 |
| DE | 0 812 741 A1 | 12/1997 |
| DE | 197 24 625 A1 | 1/1998 |
| DE | 298 05 217 U1 | 9/1998 |
| DE | 198 16 075 A1 | 10/1999 |
| DE | 198 16 080 A1 | 10/1999 |
| DE | 199 25 378 A1 * | 12/2000 |
| EP | 0 836 971 A1 | 4/1998 |
| EP | 0 967 123 A2 * | 6/1999 |
| GB | 2 289 786 A | 11/1995 |
| WO | WO 99/65737 | 12/1999 |

* cited by examiner

Primary Examiner—Paul N. Dickson
Assistant Examiner—Ruth Ilan
(74) Attorney, Agent, or Firm—Laurence A. Greenberg; Werner H. Stemer; Manfred Beck

(57) ABSTRACT

A safety device for a motor vehicle includes an airbag configuration with a sensing airbag and a protective airbag. The sensing air bag is finger-shaped and has a small volume. A gas generator inflates the sensing airbag with a low power in the event of a vehicle impact. The inflated sensing airbag extends into an inflation zone of the protective airbag in order to sense any obstacle disposed therein. A touch-sensing device is connected to the front of the sensing airbag and provides a control signal when the sensing airbag encounters an obstacle. When the control device receives the control signal, the control device prevents or at least reduces the inflation of the protective airbag. When the control device does not receive the control signal, the protective airbag is inflated with full power.

10 Claims, 4 Drawing Sheets

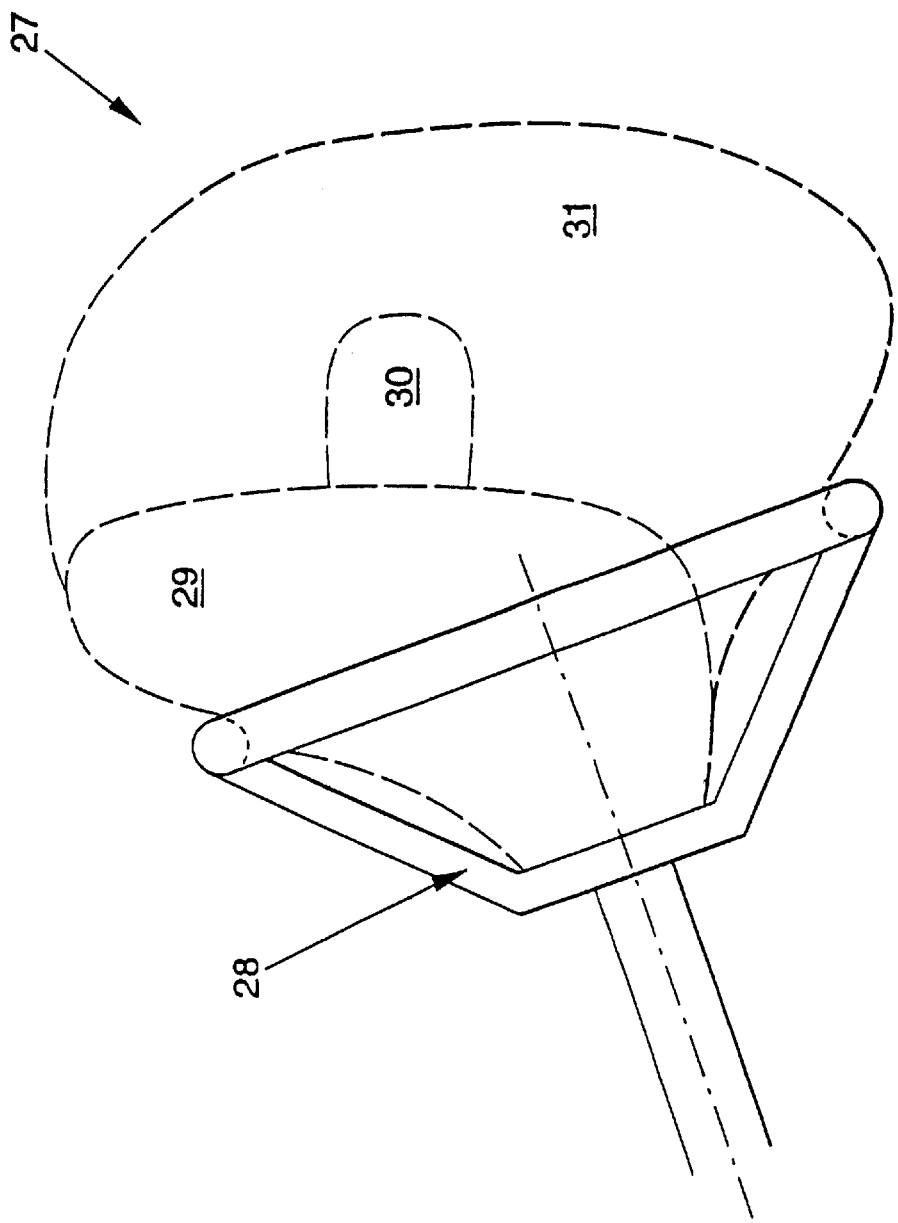

SAFETY DEVICE WITH AN AIRBAG CONFIGURATION INCLUDING MULTIPLE AIRBAGS FOR A MOTOR VEHICLE

CROSS-REFERENCE TO RELATED APPLICATION

This application is a continuation of copending International Application No. PCT/EP00/00557, filed Jan. 20, 2000, which designated the United States.

BACKGROUND OF THE INVENTION

FIELD OF THE INVENTION

The invention relates to a safety device with an airbag configuration including multiple airbags for a motor vehicle.

Various types of safety devices having airbag configurations for a motor vehicle are known in the prior art. In particular, airbag configurations with multiple airbags in the frontal, side, and head impact area of occupants are known. These airbags can be inflated through the use of respective gas generators, which are assigned to the airbags and which are activated in the event of a vehicle impact as a function of the impact deceleration and impact direction, in order to cushion the impact of an occupant.

One problem with these configurations is that an inflating airbag can have an unfavorable so-called "aggressiveness" toward occupants and objects in the inflation zone. These problems arise, in particular, in the case of occupants outside a normal position, so-called "out-of-position" (OOP) occupants, such as a child standing in front of a seat, or an adult leaning far forward, and in the case of objects on a seat, such as a child seat positioned on the seat.

The use of airbags in conjunction with measuring configurations in order to determine specific conditions, especially out-of-position situations, when an airbag is activated, and where necessary to prevent or only restrict the deployment of an airbag, is already known. The use of distance measuring configurations, which determine a proximity of an object with infrared and/or ultrasonic sensors, and the use of gravity sensors is known for this purpose. Such a complex sensor technology for the interior of a passenger compartment requires a substantial technological outlay and is accordingly expensive.

SUMMARY OF THE INVENTION

It is accordingly an object of the invention to provide a safety device for a motor vehicle which overcomes the above-mentioned disadvantages of the heretofore-known safety devices of this general type and which reduces the outlay and costs for sensor technology in the motor vehicle, in particular for sensors in the passenger compartment.

With the foregoing and other objects in view there is provided, in accordance with a first configuration according to the invention, a safety device for a motor vehicle, including:

an airbag configuration including at least a sensing airbag and a protective airbag assigned to the sensing airbag, the sensing airbag and the protective airbag being configured as two separate airbags;

the sensing air bag being finger-shaped and having a first volume, the protective airbag having a second volume, the first volume being smaller than the second volume;

at least one gas generator configured to be activatable in a vehicle impact event and configured to inflate the sensing airbag substantially prior to the protective airbag and with a relatively lower power than the protective airbag;

the protective airbag being configured to be inflated into a given inflation zone for providing a support function;

the sensing airbag being configured to extend into the given inflation zone of the protective airbag and configured to sense an obstacle disposed in the given inflation zone of the protective airbag;

a touch-sensing device connected to the sensing airbag, the touch-sensing device providing a given control signal when the sensing airbag encounters the obstacle;

a control device connected to the touch-sensing device for receiving the given control signal from the touch-sensing device;

the control device, when being provided with the given control signal from the touch-sensing device, performing a control operation selected from the group consisting of preventing the at least one gas generator from inflating the protective airbag and enabling the at least one gas generator to perform a reduced-power inflation function for inflating the protective airbag; and the control device, when the given control signal from the touch-sensing device is absent, enabling the at least one gas generator to perform a full-power inflation function for inflating the protective airbag.

In other words, in accordance with the first configuration according to the invention, there is provided a safety device with an airbag configuration including multiple airbags for a motor vehicle, the airbags being inflatable through the use of at least one gas generator activatable in the event of a vehicle impact, wherein the airbag configuration includes at least one sensing airbag and at least one protective airbag, the at least one relatively small-volume, finger-like sensing airbag has a sensing function, can be rapidly inflated on low power and is inflatable and/or movable into the inflation zone of the at least one assigned, larger-volume protective airbag having a support function, where it senses any obstacle that might possibly be in this inflation zone, especially an occupant outside a normal position (out of position: OOP), wherein a touch-sensing device is connected to the sensing airbag, wherein the touch-sensing device emits a control signal if the sensing airbag encounters an obstacle, wherein a control device is assigned to the at least one gas generator for controlling and influencing the protective airbag as a function of sensed positional parameters, wherein the control device is connected to the touch-sensing device and, on delivery of a control signal from the touch-sensing device, prevents or at least reduces an inflation function of the gas generator for the at least one protective airbag assigned to the sensing airbag, and in the absence of a control signal from the touch-sensing device enables the full-power inflation function for the at least one protective airbag, and wherein the at least one sensing airbag and the at least one protective airbag are airbags that are separate from one another.

With the objects of the invention in view there is also provided, in accordance with a second configuration according to the invention, a safety device for a motor vehicle, including:

a multi-chamber airbag configuration including at least a sensing airbag chamber and a protective airbag chamber assigned to the sensing airbag chamber, the sensing airbag chamber and the protective airbag chamber being configured as two separate airbags chambers in the multi-chamber airbag configuration;

the sensing air bag chamber being finger-shaped and having a first volume, the protective airbag chamber having a second volume, the first volume being smaller than the second volume;

at least one gas generator configured to be activatable in a vehicle impact event and configured to inflate the sensing airbag chamber substantially prior to the protective airbag chamber and with a relatively lower power than the protective airbag chamber;

the protective airbag chamber being configured to be inflated into a given inflation zone for providing a support function;

the sensing airbag chamber being configured to extend into the given inflation zone of the protective airbag chamber and configured to sense an obstacle disposed in the given inflation zone of the protective airbag chamber;

a touch-sensing device connected to the sensing airbag chamber, the touch-sensing device providing a given control signal when the sensing airbag chamber encounters the obstacle;

a control device connected to the touch-sensing device for receiving the given control signal from the touch-sensing device;

the control device, when being provided with the given control signal from the touch-sensing device, performing a control operation selected from the group consisting of preventing the at least one gas generator from inflating the protective airbag chamber and enabling the at least one gas generator to perform a reduced-power inflation function for inflating the protective airbag chamber; and the control device, when the given control signal from the touch-sensing device is absent, enabling the at least one gas generator to perform a full-power inflation function for inflating the protective airbag chamber.

In other words, in accordance with the second configuration according to the invention, there is provided a safety device with an airbag configuration including multiple airbags for a motor vehicle, the airbags being inflatable through the use of at least one gas generator activatable in the event of a vehicle impact, wherein the airbag configuration includes at least one sensing airbag and at least one protective airbag, the at least one relatively small-volume, finger-like sensing airbag has a sensing function and can be rapidly inflated with low power and is inflatable and/or movable into the inflation zone of at least one assigned, larger-volume protective airbag which has a support function, wherein the sensing airbag senses any obstacle that might possibly be in this inflation zone, especially an occupant outside a normal position (out of position: OOP), wherein a touch-sensing device is connected to the sensing airbag, wherein the touch-sensing device provides a control signal if the sensing airbag encounters an obstacle, wherein a control device is assigned to the at least one gas generator for controlling and influencing the protective airbag as a function of sensed positional parameters, wherein the control device is connected to the touch-sensing device and, on delivery of a control signal from the touch-sensing device, prevents or at least reduces an inflation function of the gas generator for the at least one protective airbag assigned to the sensing airbag, and in the absence of a control signal from the touch-sensing device enables the full-power inflation function for the at least one protective airbag, and wherein the at least one sensing airbag is a separate chamber of a multi-chamber airbag, which can be inflated prior to at least one further airbag chamber, which forms the protective airbag.

With the objects of the invention in view there is also provided, a safety device for a motor vehicle, including:

a single-chamber airbag configuration configured to provide a sensing airbag and a protective airbag assigned to the sensing airbag, the sensing airbag having a main deployment direction and having a rear region as seen in the main deployment direction;

the single-chamber airbag configuration having given wall sections at the rear region of the sensing airbag and having catch straps disposed at the given wall sections, the catch straps being formed with at least one set breaking point;

the single-chamber airbag configuration being configured to be deployed in an inflation sequence, the catch straps prevent at least portions of the given wall sections from being unfolded in an initial stage of the inflation sequence such that first the sensing airbag is inflated, and, subsequent to the sensing airbag being inflated and with increasing pressure in the single-chamber airbag configuration, the catch straps tear at the at least one set breaking point and the single-airbag configuration is fully inflated for providing the protective airbag;

the sensing air bag being finger-shaped and having a first volume, the protective airbag having a second volume, the first volume being smaller than the second volume;

at least one gas generator configured to be activatable in a vehicle impact event and configured to inflate the sensing airbag substantially prior to the protective airbag and with a relatively lower power than the protective airbag;

the protective airbag being configured to be inflated into a given inflation zone for providing a support function;

the sensing airbag being configured to extend into the given inflation zone of the protective airbag and configured to sense an obstacle disposed in the given inflation zone of the protective airbag;

a touch-sensing device connected to the sensing airbag, the touch-sensing device providing a given control signal when the sensing airbag encounters the obstacle;

a control device connected to the touch-sensing device for receiving the given control signal from the touch-sensing device;

the control device, when being provided with the given control signal from the touch-sensing device, performing a control operation selected from the group consisting of preventing the at least one gas generator from inflating the protective airbag and enabling the at least one gas generator to perform a reduced-power inflation function for inflating the protective airbag; and the control device, when the given control signal from the touch-sensing device is absent, enabling the at least one gas generator to perform a full-power inflation function for inflating the protective airbag.

In other words, in accordance with the invention, there is provided a safety device with an airbag configuration including multiple airbags for a motor vehicle, the airbags being inflatable through the use of at least one gas generator activatable in the event of a vehicle impact, wherein the airbag configuration includes at least one sensing airbag and at least one protective airbag, the at least one relatively small-volume, finger-like sensing airbag has a sensing function and can be rapidly inflated on low power, the at least one sensing airbag is inflatable and/or movable into the inflation zone of at least one assigned, larger-volume protective airbag which has a support function, wherein the sensing airbag senses any obstacle that might possibly be in this inflation zone, especially an occupant outside a normal position (out of position: OOP), wherein a touch-sensing device is connected to the sensing airbag, wherein the touch sensing device generates a control signal if the sensing airbag encounters an obstacle, wherein a control device is assigned to the at least one gas generator for controlling and influencing the protective airbag as a function of sensed positional parameters, wherein the control device is connected to the touch-sensing device and, on delivery of a control signal from the touch-sensing device, prevents or at least reduces an inflation function of the gas generator for the at least one protective airbag assigned to the sensing airbag, and in the absence of a control signal from the touch-sensing device enables the full-power inflation function for the at least one protective airbag, wherein the at least one sensing airbag can be formed with a single-chamber airbag through the use of catch straps, the catch straps being provided on wall sections around the rear region of the sensing airbag, where they hold back at least partial wall sections to prevent a deployment during an inflation sequence, so that the sensing airbag inflates first, and wherein the catch straps have at least one load-limited set breaking point and after the formation of the sensing airbag they tear, thereby allowing the deployment of the full airbag chamber as a protective airbag.

In each of the three above-defined configurations, the airbag configuration includes at least one sensing airbag and at least one protective airbag. The at least one relatively small-volume, finger-like sensing airbag has a sensing function and can be rapidly inflated on low power. The at least one sensing airbag is inflatable and/or movable into the inflation zone of at least one assigned, larger-volume protective airbag which has a support function. In this case the sensing airbag is configured to sense any obstacle that might possibly be in its inflation zone, especially an occupant outside a normal position (out of position: OOP) even before the protective airbag inflates. Connected to the sensing airbag is a touch-sensing device, which emits a control signal if the sensing airbag encounters an obstacle in the inflation zone of the protective airbag.

The airbags are inflatable through the use of at least one gas generator that can be activated in the event of a vehicle impact. A control device is assigned to the gas generator for controlling and influencing the protective airbag as a function of positional parameters sensed by the sensing airbag. This control device is connected to the touch-sensing device of the sensing airbag. On delivery of a control signal to the control device from the touch-sensing device, the inflation function of the at least one protective airbag assigned to the sensing airbag is prevented or at least reduced. In the absence of such a control signal from the touch-sensing device, the full-power inflation function for the at least one protective airbag is enabled.

The low-power sensing airbag here therefore advantageously senses positional parameters in the inflation zone of the protective airbag with little "aggressive" action and before the protective airbag is inflated, possibly with full power and an accordingly high "aggressiveness." Thus an intelligent airbag configuration is provided at relatively low cost, which reacts to specific conditions, especially to OOP conditions in the inflation zone of a protective airbag and advantageously influences its inflation behavior accordingly.

It is also possible to provide a plurality of sensing airbag and protective airbag configurations for this purpose.

In the first configuration as defined above, the at least one sensing airbag and the at least one protective airbag may be disposed separated from one another. For example, in a front-seat passenger configuration the sensing airbag may extend from the front, out of the dashboard and an assigned head protection airbag can be inflated such that it extends from a roof area. A corresponding airbag configuration is also possible for a driver, wherein a sensing airbag is inflatable from the steering wheel region. Corresponding configurations of sensing airbags and protective airbags are also possible for side airbag configurations and/or airbag configurations for the occupants of rear seats.

In the second configuration as defined above, the at least one sensing airbag may be configured as a separate chamber of a multi-chamber airbag. A sensing airbag chamber is here inflated prior to at least one further airbag chamber, which forms the protective airbag. In this configuration also, the sensing airbag is rapidly inflated on low power and the at least one further airbag chamber is filled, as a protective airbag, in dependence of any positional parameters sensed.

In the third configuration as defined above, at least one sensing airbag is formed with a single-chamber airbag. To form the sensing airbag, catch straps or tethers are used on wall sections, in order to temporarily restrain or prevent the deployment of partial wall sections during the inflation sequence in such a way that the at least one sensing airbag inflates first. With a subsequent pressure increase for forming the full single-chamber airbag as a protective airbag, these catch straps are intended to tear. Here, too, the control device has a correspondingly advantageous influence on the process of inflating the entire airbag chamber as the protective airbag wherein positional parameters are sensed by the sensing airbag. Instead of or in addition to using catch straps a sensing airbag may also be formed by the use of differing fabric stiffnesses and/or different types of fabric for the airbag fabric.

According to an advantageous embodiment of the aforementioned configurations, a first airbag and/or a first airbag chamber should initially deploy vertically upward at low power in order to force the hands of a vehicle occupant away. This may be used, for example, to force the hands away from a steering wheel in the case of a driver airbag or to force the hands away from the dashboard in the case of a front-passenger airbag. The sensing airbag can then be inflated as a second airbag, wherein the inflation of the sensing airbag is no longer impeded by hands that may have rested on the steering wheel or the dashboard. Only then is the protective airbag, where necessary, filled as a third airbag.

An airbag flap that can be opened as far as a given open position can have a guide function for a specific, predetermined inflation direction of the sensing airbag or for the above-mentioned first airbag for forcing the hands away. The deployment of a sensing airbag with regard to the geometrical parameter and the timing during the inflation phase can moreover be advantageously adapted and adjusted to individual conditions, in particular vehicle-specific conditions, through the positioning, the configuration and the shape of at least one airbag flap.

According to another feature of the invention, the sensing airbag is disposed such that the sensing air bag is inflatable from a steering wheel region and the protective airbag is a driver-protection airbag assigned to the sensing airbag. Correspondingly, a sensing airbag is disposed such that the sensing air bag is inflatable from a dashboard region and the protective airbag is a front passenger-protection airbag assigned to the sensing airbag.

The touch-sensing device of the sensing airbag may include a velocity and/or acceleration measuring device for the expansion of the sensing airbag, and/or a load-measuring film in combination with a threshold device downstream of the respective measuring device. Below a predetermined velocity and/or acceleration set point and/or a measured load value, a control signal for the control device is then output as a sensed positional parameter. Alternatively or in addition, the touch-sensing device may also have switch contacts and/or a contact film, preferably in the front region of the sensing airbag, wherein one or several switch contacts are then actuated should the sensing airbag encounter an obstacle.

The airbags used for the airbag configuration may be isolated from one another with regard to their filling and may each be filled by a separate, assigned gas generator. A configuration with at least one multistage generator that can be controlled by the control device is also possible. In this case a first stage is ignited in order to inflate the at least one sensing airbag and where necessary a further stage in order to inflate the protective airbag. If the touch-sensing device responds by emitting a control signal, the control suppresses the ignition of the further stage for the at least one protective airbag or, where necessary, reduces the filling of the at least one protective airbag.

The preliminary sensing of interior parameters, i.e. parameters concerning the interior of the passenger compartment, through the use of a sensing airbag may result in disadvantages with respect to the timing of the filling process of the protective airbag. In order to compensate for such possible timing disadvantages, it is proposed to use early crash sensors and/or pre-crash sensors, which are per se known, in connection with the airbag configuration according to the invention.

Although the invention is illustrated and described herein as embodied in a safety device with an airbag configuration including multiple airbags for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic view of a safety device with a driver's airbag configuration according to the invention;

DESCRIPTION OF THE PREFERRED EMBODIMENTS

Figure 1:
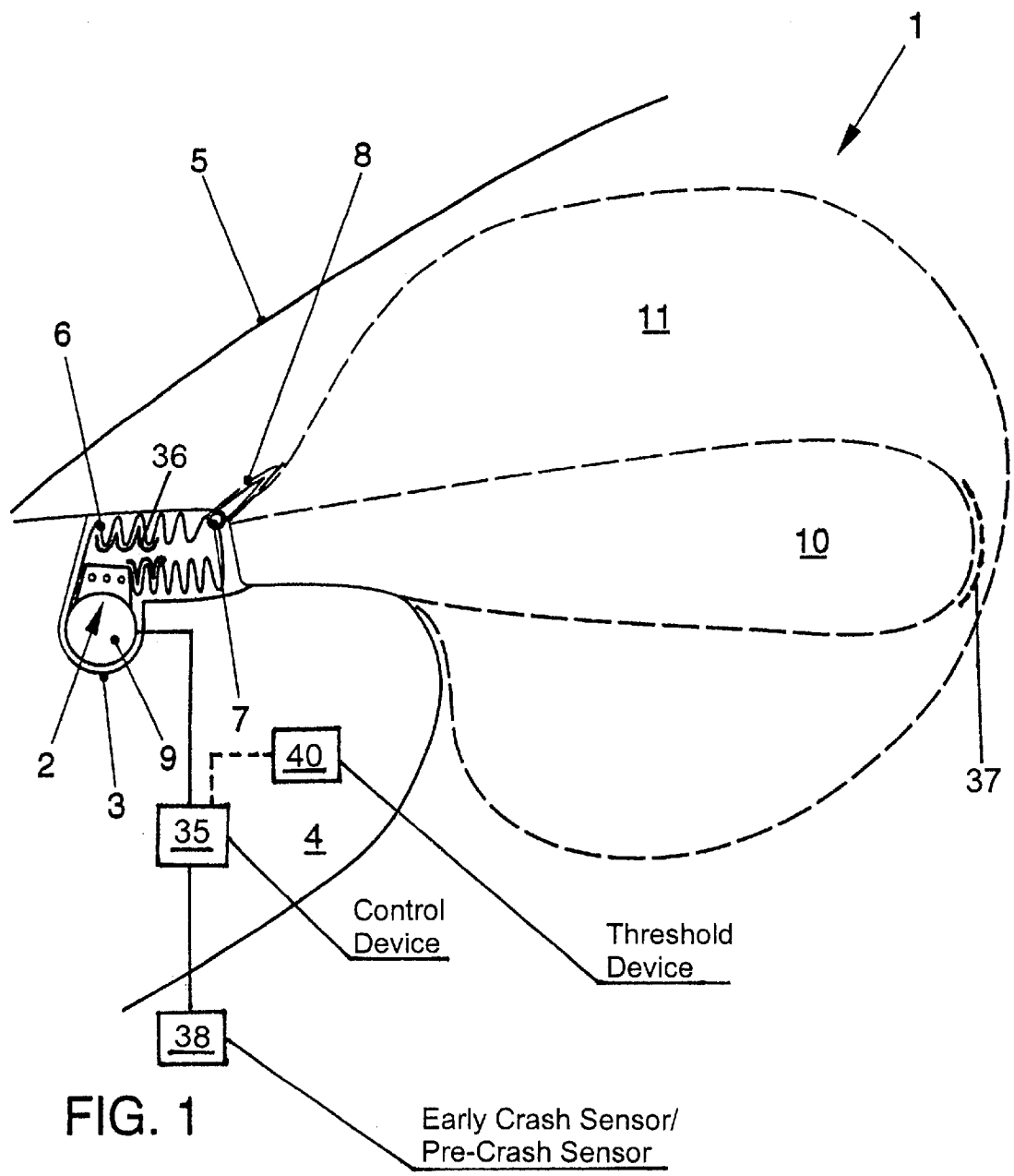
FIG. 1 is a diagrammatic view of a safety device according to a first embodiment of a front-passenger airbag configuration according to the invention.

Referring now to the figures of the drawings in detail and first, particularly, to FIG. 1 thereof, there is shown a safety device 1. This safety device 1 includes an airbag module 2, which is accommodated in a module housing 3 of a console 4 in the front-passenger area of a motor vehicle below the windshield 5. The airbag module 2 includes a gas generator 9, to which an airbag 6 is connected.

In the unactivated state the airbag 6, as represented by continuous lines in FIG. 1, is accommodated folded up in the module housing 3, an airbag outlet aperture 7 in the unactivated state of the airbag 6 being closed by a cover flap 8, pivotally hinged at the opening edge.

The gas generator 9 is a multistage generator, which can be controlled by a control device 35 and which, subsequent to the ignition of a first stage in the event of a crash, first inflates a sensing airbag 10 at low power and with little aggressive action for sensing positional parameters of an occupant. The sensing airbag 10 is formed by the use of catch straps 36, which are formed on wall sections around the rear region of the sensing airbag 10, so that at the start of the inflation sequence partial wall sections of the airbag 6 are held back in order to prevent a deployment and so that the sensing airbag 10, which has a relatively small volume, is formed in the shape of a finger.

This sensing airbag 10 is capable of sensing an occupant who might be in the inflation zone and thus outside a normal position (out of position: OOP) before the airbag 6 deploys fully to form a protective airbag 11 which is diagrammatically illustrated by a dashed line in FIG. 1. For this purpose a touch-sensing device 37, for example in the form of switch contacts, is provided in a front area of the inflated sensing airbag 10. The switch contacts vary their relative position and deliver a control signal to the control device 35 if the sensing airbag 10 encounters the occupant. The touch-sensing device 37 of the sensing airbag may also include a velocity and/or acceleration measuring device for the expansion of the sensing airbag 10, and/or a load-measuring film in combination with a threshold device 40 downstream of the respective measuring device.

By supplying the control device 35 with the control signal resulting from the touch-sensing, which is performed by the sensing airbag 10 and which indicates that an occupant is outside the normal position, the control device 35 prevents or at least reduces the inflation function of the protective airbag 11, so that the airbag 6 is, where necessary, only inflated at low power which results in a less aggressive action on the occupant. In the absence of such a control signal from the touch-sensing device, the second generator stage is ignited and released at full power for a full inflation of the protective airbag 11. Depending on the predetermined set breaking point of the catch straps 36, these tear in the event of a given pressure increase, thereby releasing the airbag 6 for full deployment of the protective airbag 11. Early crash sensors and/or pre-crash sensors 38 are used in order to compensate for disadvantages with respect to the timing of the filling process for the protective airbag 11.

Figure 2:
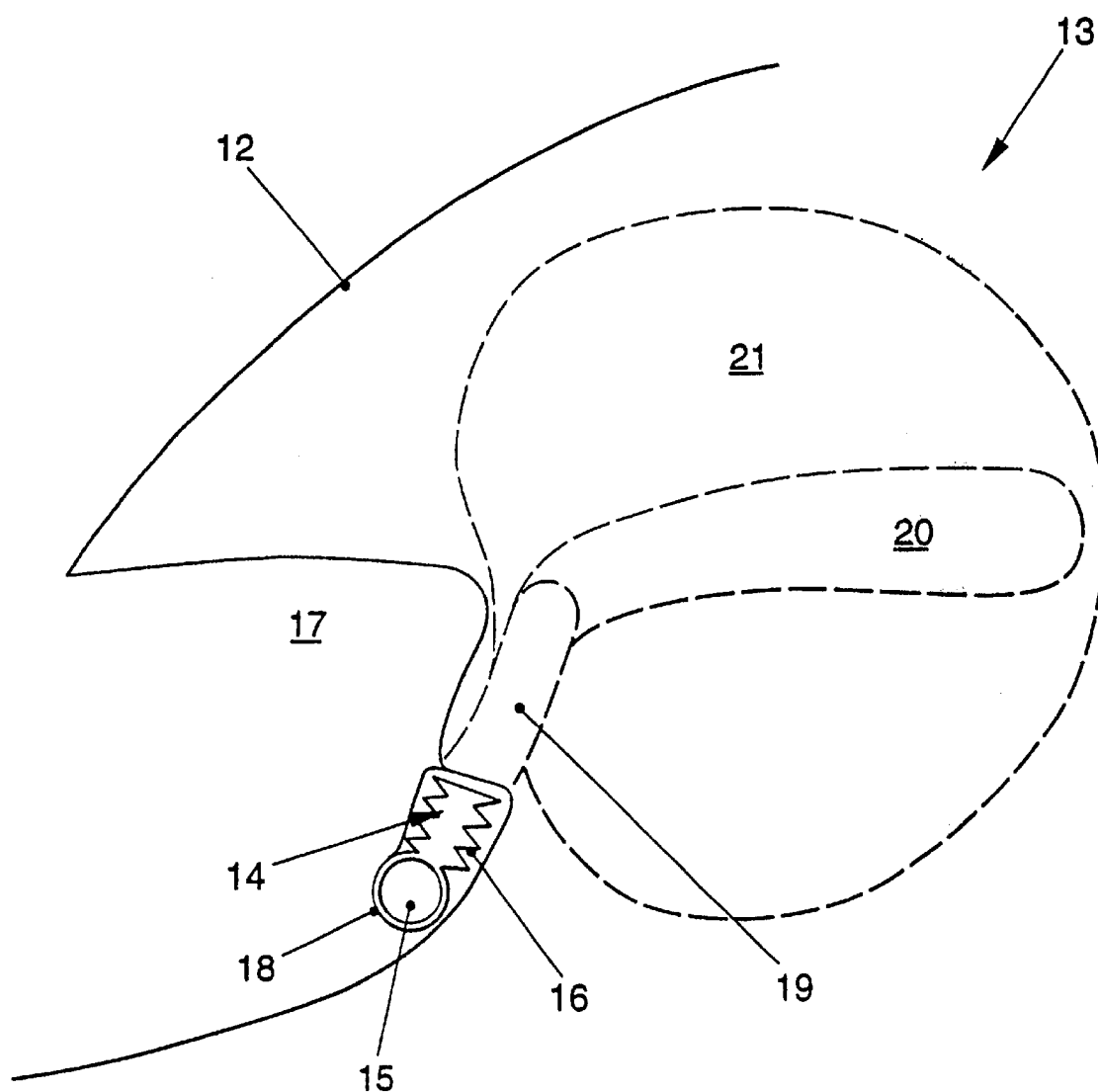
FIG. 2 is a diagrammatic view of a safety device according to a second embodiment of a front-passenger airbag configuration according to the invention.

FIG. 2 represents an alternative embodiment of a safety device 13. An airbag module 14, including a gas generator 15 and an airbag configuration 16, is here provided in a module housing 18 in a lower, projecting area of a console 17, provided below a windshield 12. The airbag configuration 16 includes multiple airbags 19, 20, 21, more specifically, a first airbag 19, a second airbag 20 as a sensing airbag and a third airbag as a protective airbag 21.

In the event of a crash, firstly the first airbag 19, as represented diagrammatically in FIG. 2, deploys upward in an approximately vertical direction at low power in order to force the hands of a vehicle occupant away from the console 17. The sensing airbag 20 is then inflated as a second airbag for a touch-sensing operation in the manner described in connection with FIG. 1, wherein it is no longer possible that hands that might have been resting in the console area may impede its deployment. Only then, in accordance with the outcome of the touch-sensing operation, is the protective airbag 21 filled in the same way as described above in connection with FIG. 1.

Figure 5:
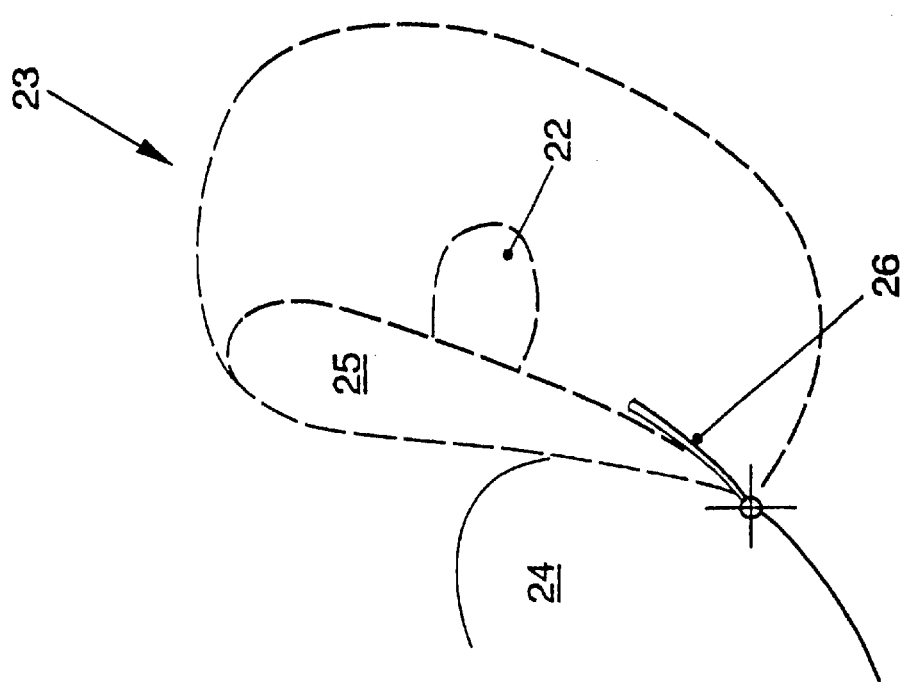
FIG. 5 is a diagrammatic view of a safety device with a front-passenger airbag configuration guided by a flap according to the invention.

As can be seen from FIG. 5, which shows a third embodiment of a safety device 23 on a front-passenger console 24, an airbag flap 26 that can be opened as far as a given open position may be used for performing a guide function for a specific, predetermined inflation direction of a first airbag 25 for forcing the hands away. After forcing the hands away, a sensing airbag 22 for performing the touch-sensing operation is then inflated in the manner described above.

FIG. 3 represents an embodiment of a safety device 27 for a driver of a vehicle. This safety device 27 is formed in a steering wheel area 28. A gas generator, not shown in FIG. 3, fills a first airbag 29 in order to force the hands away from the steering wheel. A sensing airbag 30 is then inflated, which senses whether the driver of the vehicle is outside a normal position. Depending on the detected position of the driver, the protective airbag 31 is either inflated at full power in the manner previously described or the filling of the protective airbag 31 is prevented or at least reduced as a function of the control signal delivered to the control device 35.

Figure 4:
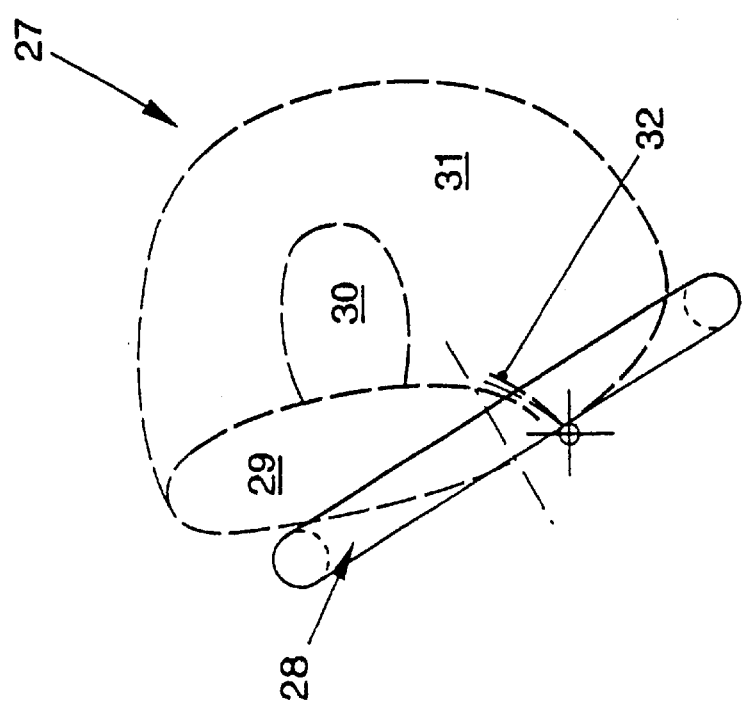
FIG. 4 is a diagrammatic view of a safety device with a driver's airbag configuration guided by a flap according to the invention.

FIG. 4 shows the airbag configuration of FIG. 3 in combination with a cover flap 32 having the guide flap function as described for the safety device shown in FIG. 5.

We claim:

1. A safety device for a motor vehicle, comprising:
a single-chamber airbag configuration configured to operate as a sensing airbag and as a protective airbag, said single-chamber airbag configuration, when operating as said sensing airbag, having a main deployment direction and having a rear region as seen in the main deployment direction;
said single-chamber airbag configuration having given wall sections at said rear region and having catch straps disposed at said given wall sections, said catch straps being formed with at least one set breaking point;
said single-chamber airbag configuration being configured to be deployed in an inflation sequence, said catch straps prevent at least portions of said given wall sections from being unfolded in an initial stage of the inflation sequence such that first said single-chamber airbag configuration is inflated to operate as said sensing airbag, and, subsequent to said single-chamber airbag configuration being inflated for operating as said sensing airbag and with increasing pressure in said single-chamber airbag configuration, said catch straps tear at the at least one set breaking point and said single-chamber airbag configuration is fully inflated such that said single-chamber airbag configuration operates as said protective airbag;
said single-chamber airbag configuration, when operating as said sensing air bag, being finger-shaped and having a first volume, and said single-chamber airbag configuration, when operating as said protective airbag, having a second volume, said first volume being smaller than said second volume;
at least one gas generator configured to be activatable in a vehicle impact event and configured to inflate said single-chamber airbag configuration with a relatively lower power in order to operate as said sensing airbag substantially prior to inflating said single-chamber airbag configuration with a relatively higher power in order to operate as said protective airbag;
said single-chamber airbag configuration, when operating as said protective airbag, being inflated into a given inflation zone for providing a support function;
said single-chamber airbag configuration, when operating as said sensing airbag, being configured to extend into the given inflation zone and configured to sense an obstacle disposed in the given inflation zone;
a touch-sensing device connected to said single-chamber airbag configuration, said touch-sensing device providing a given control signal when said single-chamber airbag configuration operates as said sensing airbag and encounters the obstacle;
a control device connected to said touch-sensing device for receiving the given control signal from said touch-sensing device;
said control device, when being provided with the given control signal from said touch-sensing device, performing a control operation selected from the group consisting of preventing said at least one gas generator from further inflating said single-chamber airbag configuration in order to prevent said single-chamber airbag configuration from operating as said protective airbag and enabling said at least one gas generator to perform a reduced-power inflation function for inflating said single-chamber airbag configuration in order to operate as said protective airbag; and
said control device, when the given control signal from said touch-sensing device is absent, enabling said at least one gas generator to perform a full-power inflation function for inflating said single-chamber airbag configuration in order to operate as said protective airbag.

2. The safety device according to claim 1, wherein:
said touch-sensing device includes switch contacts; and
said switch contacts have a relative position with respect to one another and are configured to change the relative position with respect to one another for one of opening and closing an electrical path and providing the given control signal when said sensing airbag encounters the obstacle.

3. The safety device according to claim 1, wherein said touch-sensing device includes a contact film configured to one of open and close an electrical path for providing the control signal when said sensing airbag encounters the obstacle.

4. The safety device according to claim 1, wherein:
said sensing airbag has a main deployment direction and a front region as seen in the main deployment direction; and
said touch-sensing device is disposed in said front region of said sensing airbag.

5. The safety device according to claim 1, wherein:
said at least one gas generator is a multistage gas generator having a first stage and further stages; and
said control device controls said multistage gas generator for inflating said sensing airbag and said protective airbag such that the first stage of said multistage gas generator is ignited in order to inflate said sensing airbag, and such that, if said touch-sensing device provides the given control signal, a control operation selected from the group consisting of preventing an ignition of the further stages of said multistage gas generator and igniting at least one of the further stages for enabling said multistage gas generator to perform a reduced-power inflation function for inflating said protective airbag is performed.

6. The safety device according to claim 1, including an early crash sensor operatively connected to said control device for sensing a vehicle impact event that is relevant for activating said single-chamber airbag configuration.

7. The safety device according to claim 1, including a pre-crash sensor operatively connected to said control device for sensing, prior to a vehicle impact event, data relevant for activating said single-chamber airbag configuration.

8. The safety device according to claim 1, wherein said sensing airbag is configured to sense, as the obstacle, an out-of-position occupant.

9. The safety device according to claim 1, wherein said control device controls said at least one gas generator based on the given control signal as a sensed positional parameter and based on further positional parameters provided to said control device.

10. The safety device according to claim 1, wherein said sensing air bag extends into the given inflation zone of said protective airbag by being at least one of movable and inflatable into the given inflation zone.

* * * * *